United States Patent [19]

Hartl et al.

[11] Patent Number: 4,714,014
[45] Date of Patent: Dec. 22, 1987

[54] AUTOMATIC CRIMPING MECHANISM FOR PROTEINACEOUS PATTIES

[75] Inventors: Carroll P. Hartl; James M. Heitman, both of Madison, Wis.

[73] Assignee: Oscar Mayer Foods Corporation, Madison, Wis.

[21] Appl. No.: 833,637

[22] Filed: Feb. 25, 1986

[51] Int. Cl.$^4$ .............................................. A22C 17/00
[52] U.S. Cl. ................................. 99/450.2; 99/450.4; 99/450.7
[58] Field of Search ................. 99/450.1, 349, 450.2, 99/351, 450.4, 450.6, 450.7, 532, 533, 485, 353; 426/513, 272; 17/25, 32, 45, 46

[56] References Cited

U.S. PATENT DOCUMENTS

| | | | |
|---|---|---|---|
| 2,673,156 | 3/1954 | Minder | 426/513 |
| 3,782,270 | 1/1974 | Sollerud | 99/450.7 X |
| 3,782,271 | 1/1974 | Tobey et al. | 99/450.6 |
| 3,869,975 | 3/1975 | Seewer | 99/450.2 |
| 3,999,248 | 12/1976 | Mayer et al. | 426/513 X |
| 4,138,768 | 2/1979 | Roth | 17/32 |
| 4,170,933 | 10/1979 | Meamber | 17/25 X |
| 4,608,918 | 9/1986 | Funabashi et al. | 99/450.7 X |

Primary Examiner—Timothy F. Simone
Attorney, Agent, or Firm—Joseph T. Harcarik; Thomas R. Savoie; Daniel J. Donovan

[57] ABSTRACT

An automatic crimping mechanism is provided for knitting together multi-layered proteinaceous patty products while those products are being conveyed along a pathway generally beneath the automatic crimping mechanism. By operation of the crimping mechanism, a plurality of pins enter the proteinaceous patties to thereby knit them together. An automatic washing assembly can be included whereby the crimping head assemblies are automatically cycled between a crimping orientation and a washing orientation.

16 Claims, 17 Drawing Figures

FIG_3

AUTOMATIC CRIMPING MECHANISM FOR PROTEINACEOUS PATTIES

BACKGROUND AND DESCRIPTION OF THE INVENTION

The present invention generally relates to an apparatus and method for knitting layers of proteinaceous patties together. More particularly, the apparatus includes a crimper assembly that has a plurality of projections that enter proteinaceous patties in order to thereby knit them together, which crimper assembly is arranged such that the proteinaceous patties can be knitted together while they are being conveyed along a pathway passing generally under the crimping assembly. The apparatus is especially suitable for knitting together two meat patties having food material positioned generally therebetween in order to form a product in the nature of a stuffed meat food item that is assembled from individually formed meat patties.

Previous attempts have been made to produce proteinaceous products that are filled with other food items in the nature of condiments such as sauces, spices, cheeses, bacon pieces, and vegetables that are chopped, chunked, flaked or otherwise processed or shaped. Generally speaking, such prior approaches do not knit together a plurality of patties in a manner in which the patties may have condiments or the like located therebetween. One approach that is directed to this function is described in a copending, commonly assigned patent application Ser. No. 705,762, filed Feb. 26, 1985. The invention of that application relates to a device and a process for knitting proteinaceous patties together that have condiments placed therebetween and projections are inserted through one patty and into a second patty thereunder in order to knit the patties together. However, this invention is not particularly suitable for use in an automated operation for continuously knitting together large numbers of these products, especially while those products are being conveyed as a continuous flow to and away from the crimping mechanism.

When knitted proteinaceous patty products are to be processed under high volume or industrial-type conditions, it is important to be able to accomplish the knitting operation on a continuous basis and in a manner in which the product produced is of consistent quality and appearance. Another important consideration is the ability to maintain cleanliness conditions that are needed for food processing operations. Additionally, after pins or other projecting members have penetrated proteinaceous patties for a number of times, there is a tendency for proteinaceous material to build up on the pins and on associated components, as a result of which it is desirable to achieve an automatic approach for cleaning these pins and other components of the crimping assembly in order to enhance the operability of the apparatus as well as to maintain cleanliness conditions during continuous production of knitted patty products.

Considerations and features of this type are associated with the present invention, which includes an apparatus for knitting layers, or a plurality of proteinaceous patties together. Included is a crimper assembly that is arranged for cyclical interaction with proteinaceous patties being conveyed in a generally longitudinal stream whereby the proteinaceous patties of the conveyed stream of products are subjected to knitting conditions while the stream of products is conveyed past the crimper assembly. The cyclical operation in this regard is typically associated with a camming assembly or arrangement which is incorporated into the control mechanism for the crimper assembly, with the result that a crimper head having projections or pins moves generally downwardly into engagement with the proteinaceous patties while the products are conveyed and until the patties are satisfactorily knitted together by the pins, after which the crimper head moves generally upwardly and out of engagement with the proteinaceous patty product. In an especially advantageous aspect of this invention, a washing assembly is included for washing suitable components of the crimper assembly without having to interrupt the operation of the apparatus.

It is accordingly a general object of the present invention to provide an improved apparatus and method for knitting a plurality of proteinaceous layers together.

Another object of this invention is to provide an improved apparatus and method for cyclically imparting knitting motion to a flow of multi-layered proteinaceous patty items in order to thereby knit each patty item together.

Another object of the present invention is provide an improved apparatus and method for knitting layers of proteinaceous patties together with one set of crimping heads while another set of crimping heads is being subjected to cleaning operations.

Another object of the present invention is to provide an improved apparatus and method for knitting one proteinaceous patty to another while the patties are being longitudinally transported along a conveyorized pathway.

Another object of this invention is to provide an improved apparatus and method for knitting together a product including a plurality of proteinaceous patties with condiment material located generally therebetween.

Another object of the present invention is to provide an improved apparatus and method for knitting together proteinaceous patties having a filling generally therebetween while simultaneously shaping the product thus formed.

These and other objects, features and advantages of this invention will be clearly understood through a consideration of the following detailed description.

BRIEF DESCRIPTION OF THE DRAWINGS

In the course of this description, reference will be made to the attached drawings, wherein.

Figure 1:
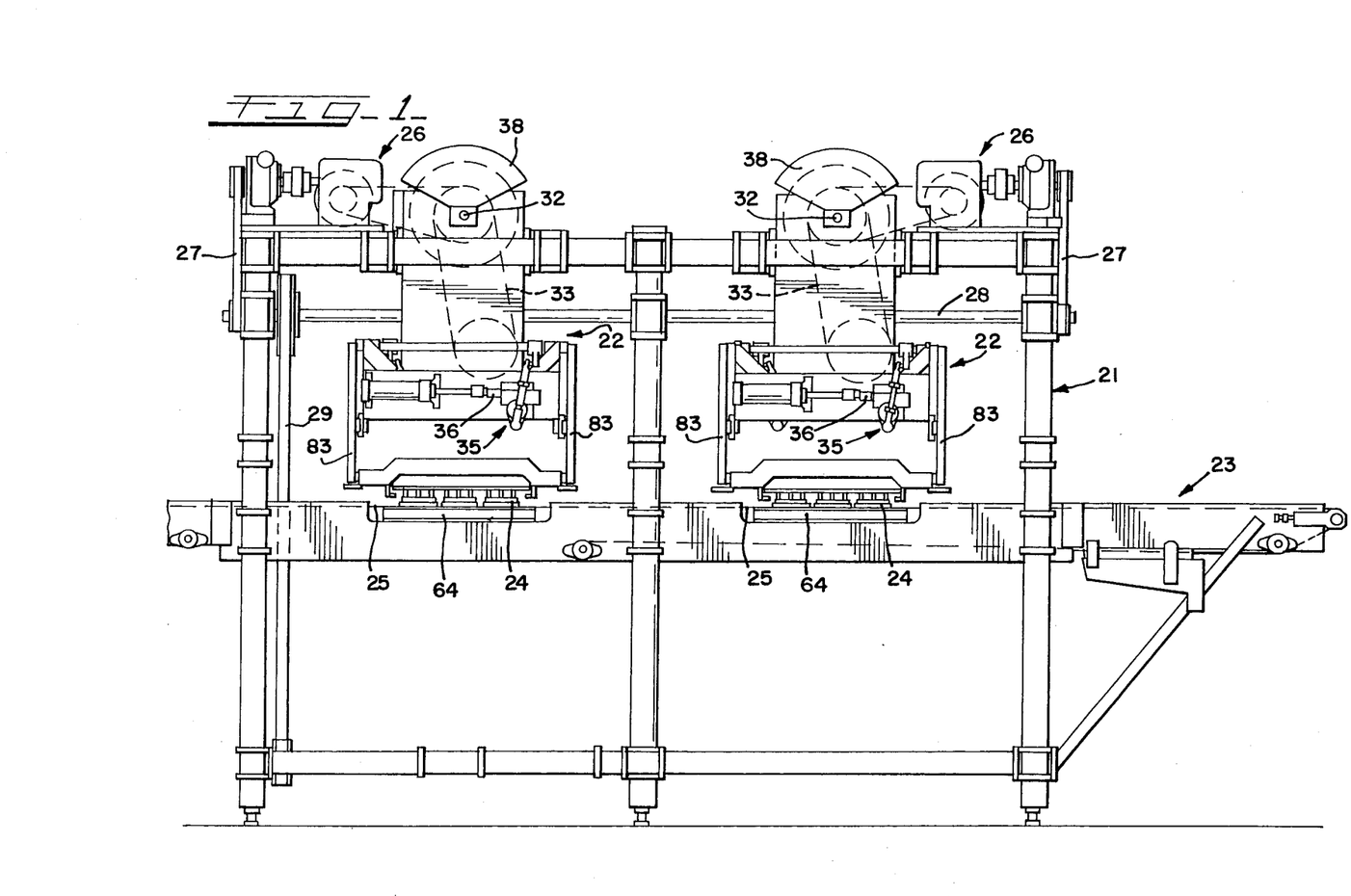
FIG. 1 is a side elevational view of a preferred embodiment of the knitting apparatus according to this invention.

The apparatus as it is illustrated in FIG. 1 includes a frame assembly, generally designated as 21, which supports a plurality of crimper assemblies 22, and receives a conveyor assembly, generally designated as 23. Crimper heads 24 of the crimper assemblies 22 operatively engage, in a manner to be discussed in further detail herein, layered proteinaceous patties positioned on and moving with a conveyor belt 25 of the conveyor assembly 23. One or more crimper drive assemblies 26 initiate desired movement of the crimper assemblies 22. Crimper drive assemblies 26 are advantageously driven by belts 27 or the like off of a drive shaft 28 which may itself be driven through a belt 29 or the like from a line shaft or the like which is also associated with means for driving the conveyor assembly 23, thereby facilitating timed sequencing of the crimper assemblies 22 and the conveyor assembly 23.

Figure 2:
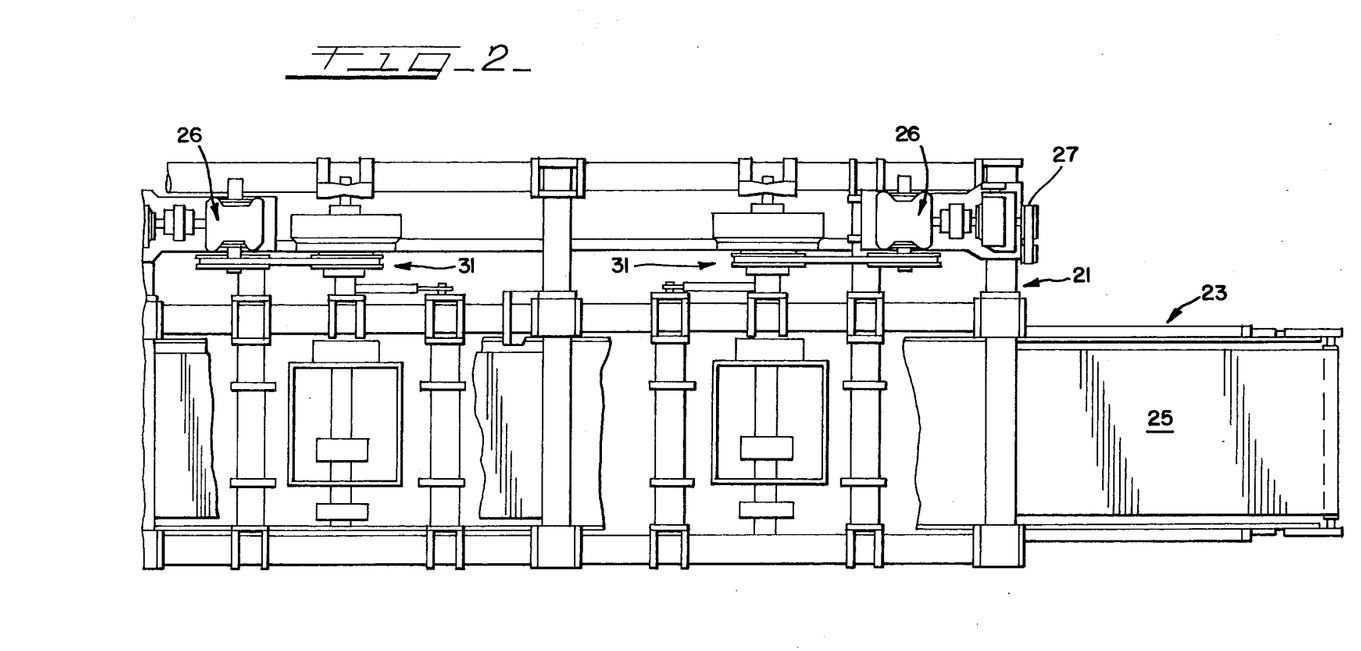
FIG. 2 is a top plan view, partially broken away, of the apparatus illustrated in FIG. 1.
Figure 4:
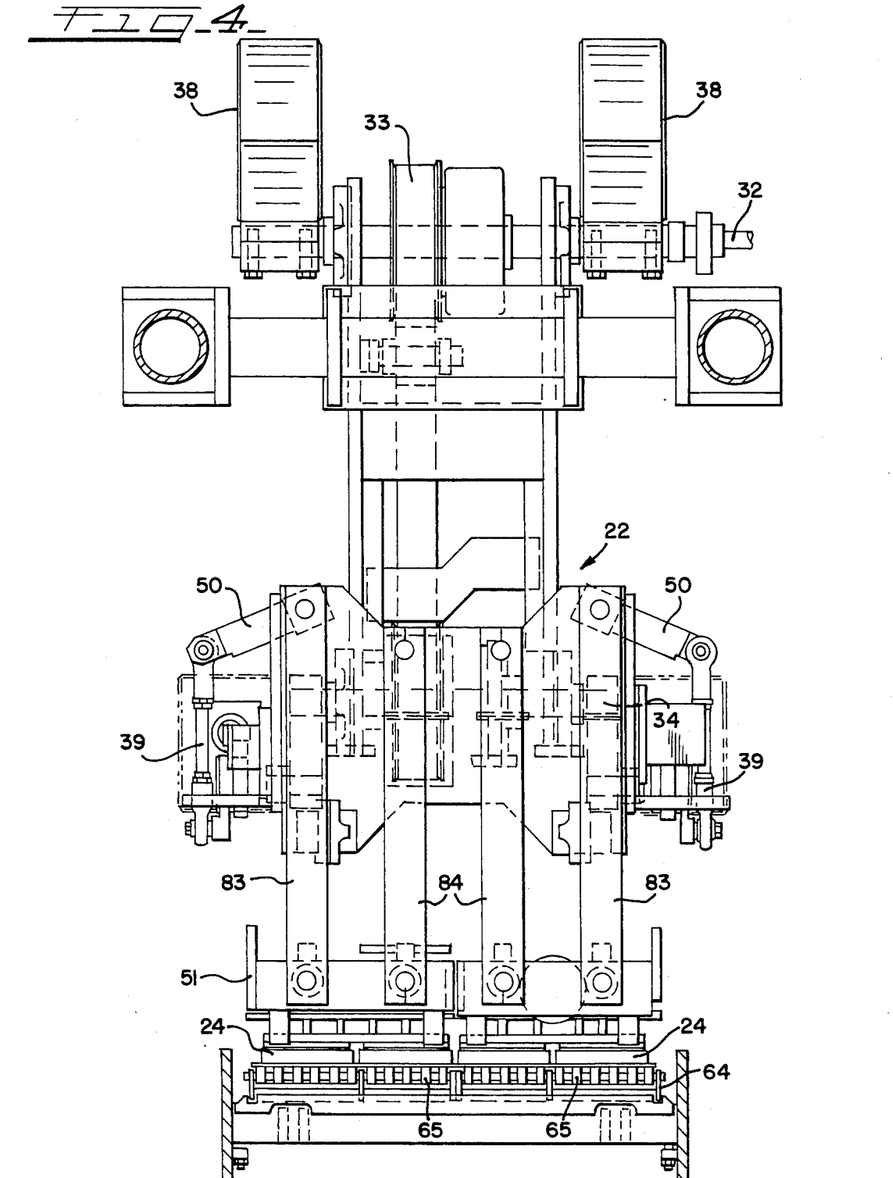
FIG. 4 is an end elevational view of the crimper assembly shown in FIG. 3.
Figure 5:
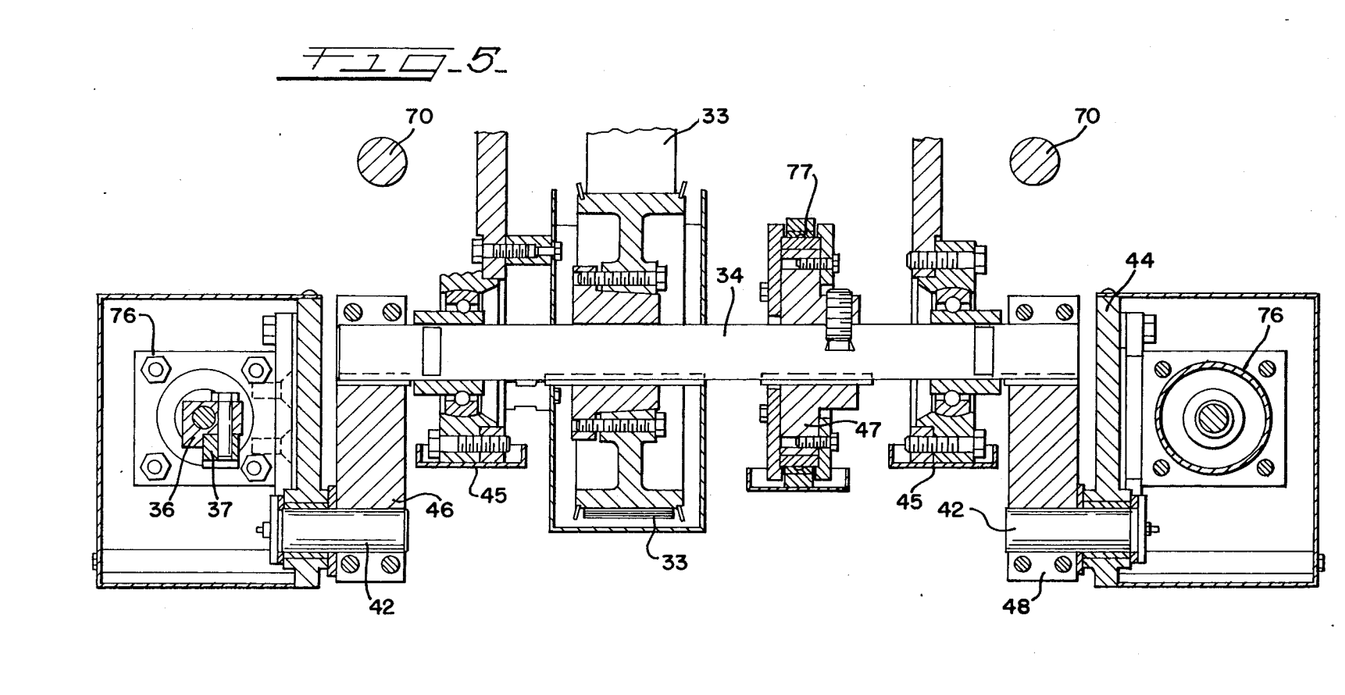
FIG. 5 is a cross-sectional view along the line 5—5 of FIG. 3.
Figure 6:
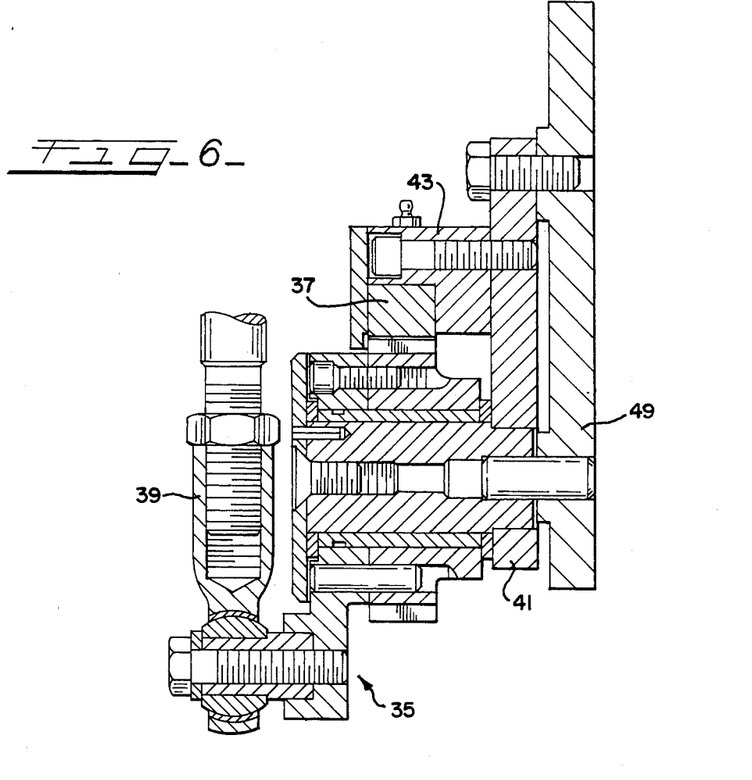
FIG. 6 is a cross-sectional view along the line 6—6 of FIG. 3.
Figure 7:
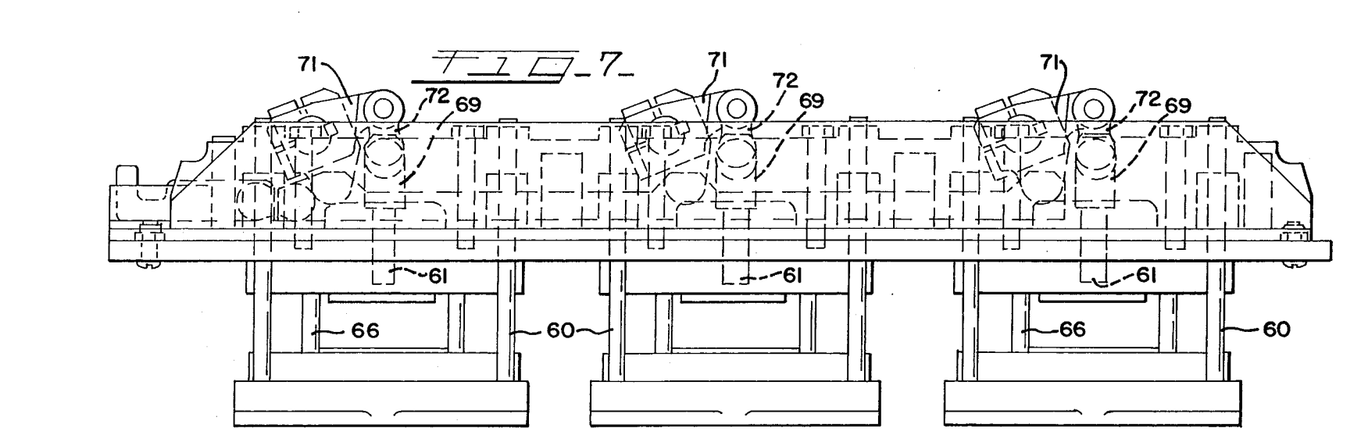
FIG. 7 is an enlarged side elevational view of the crimper head assembly shown in FIG. 3.
Figure 8:
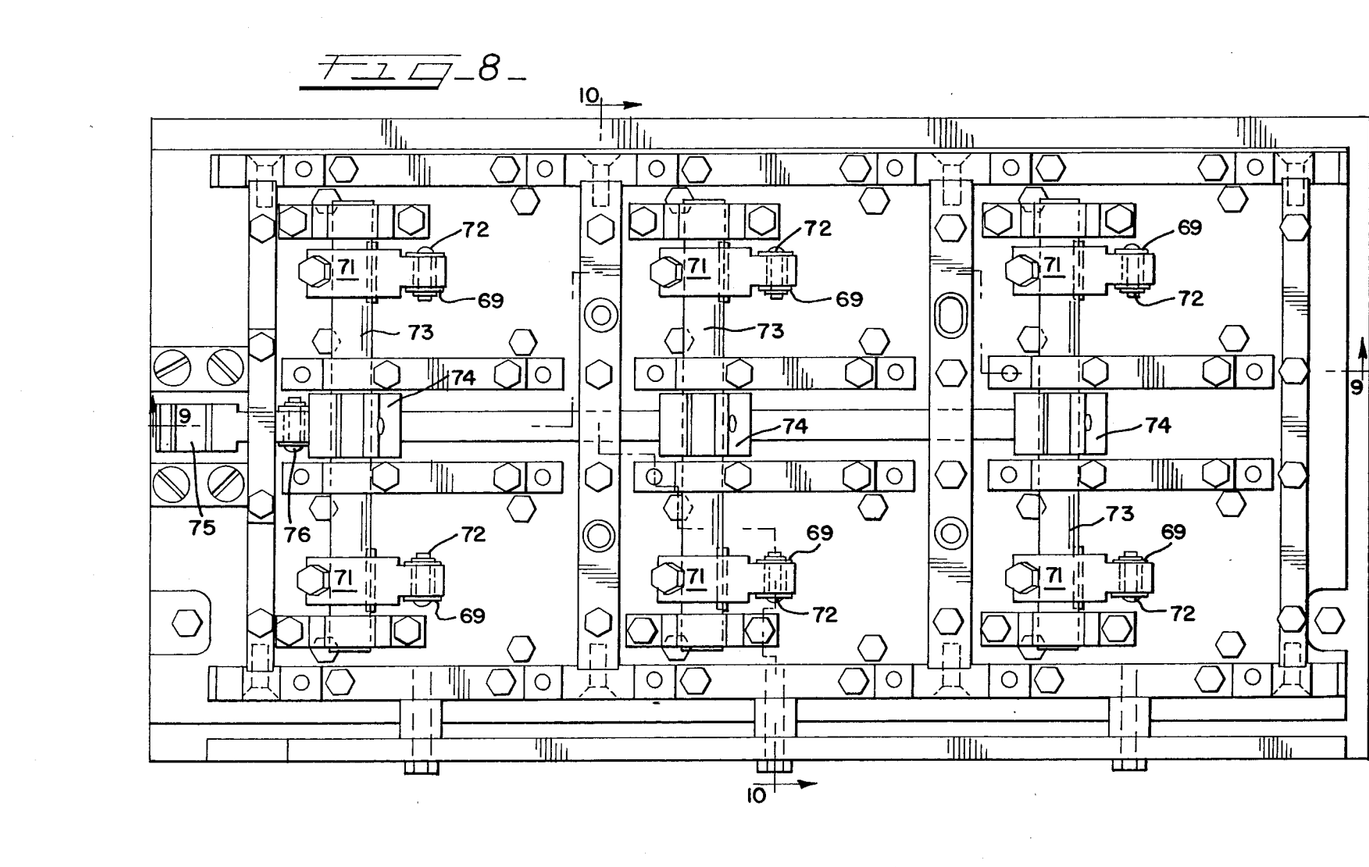
FIG. 8 is a top plan view of the crimper head assembly illustrated in FIG. 7.
Figure 9:
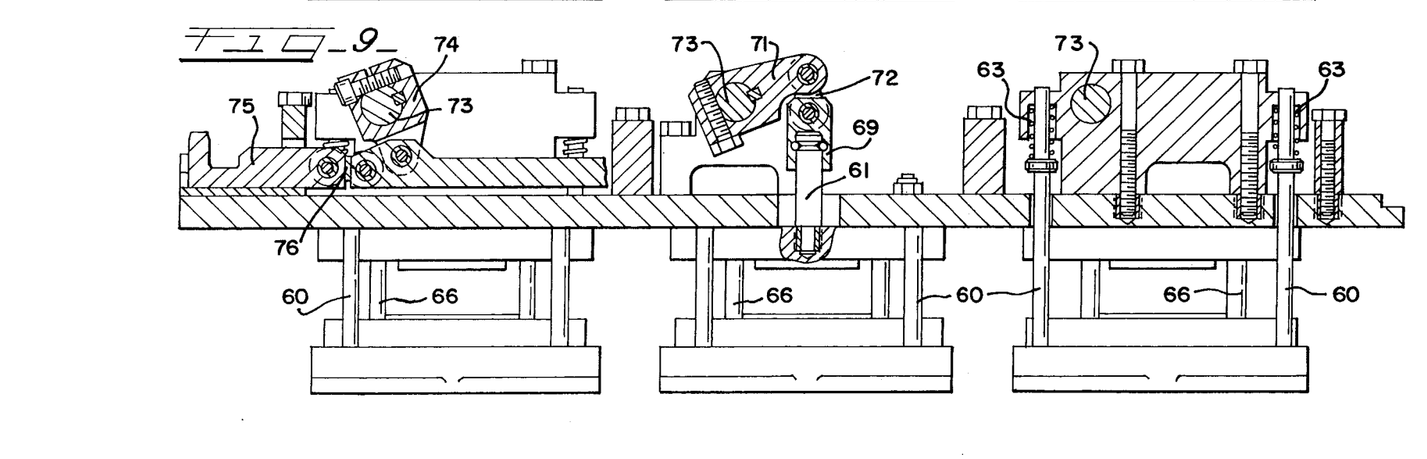
FIG. 9 is a cross-sectional view along the line 9—9 of FIG. 8.
Figure 10:
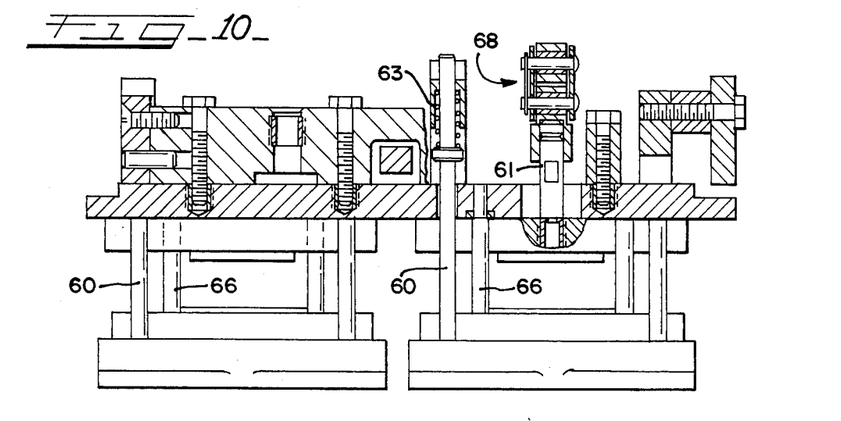
FIG. 10 is a cross-sectional view along the line 10—10 of FIG. 8.

Dual crimper assemblies 22, as generally shown in FIGS. 1 and 2, are provided so that one of the crimping assemblies 22 can be in a cleaning mode while the other crimper assembly is in a crimping mode. Further details of each crimper assembly 22 are provided in FIGS. 3 and 4. Crimper drive assembly 26 provides a substantially constant-speed drive input to a cam assembly, generally designated as 31 (FIG. 2), which in turn provides non-linear output to an output shaft 32 for driving the crimper assembly 22 through an output drive member such as the illustrated output pulley and belt assembly 33. Assembly 33 generally rotates the crimper assembly 22 by turning crank shafts 34 that rotate crank assemblies 46 which move a center frame 49 through a cyclic rotary motion. Each crank shaft 34 is connected through a link 77, and each crank shaft 34 has two crank assemblies 46 that connect to the frame 49 through four crank pins 42. The crank shaft 34 is rotatably mounted to the crimper assembly upper frame 44 by suitable bearings, as illustrated in FIG. 5, which also shows crank assemblies 46, 47 and 48. The crimper heads 24 are supported by a lower frame 51 of the crimper assembly. Counterweights 38 are provided to assist in maintaining balance during operation of the crimper assemblies 22.

Various components such as these of the crimper assemblies 22 and also of the cam assembly 31 direct the movement of each crimper head 24 such that each moves at substantially the same speed as the conveyor belt 25 during the bottommost portion of the desired motion of each crimper assembly 22. Additionally, each crimper head 24 moves through a plane substantially parallel to the plane of the conveyor belt 25 at the downwardmost location of the respective crimper heads 24. In this manner, there is substantially no relative lateral movement between each crimper head 24 and the conveyor belt 25 during the time that the crimping operations are being carried out. This substantially prevents smearing of the lowermost proteinaceous patty or layer during the crimping operation, and it also maintains product orientation and integrity during the crimping operation.

Figure 11:
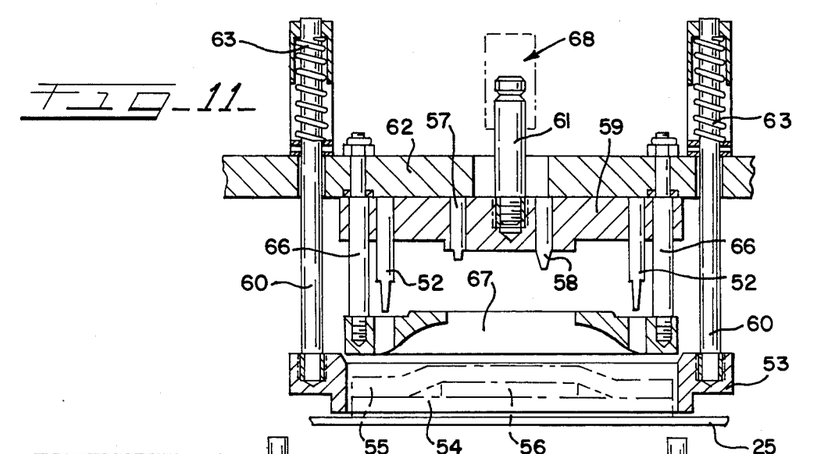
FIG. 11 is a cross-sectional view through the preferred crimper head assembly according to this invention, showing same oriented for crimping proteinaceous patties together but out of actual crimping engagement with the patties.
Figure 12:
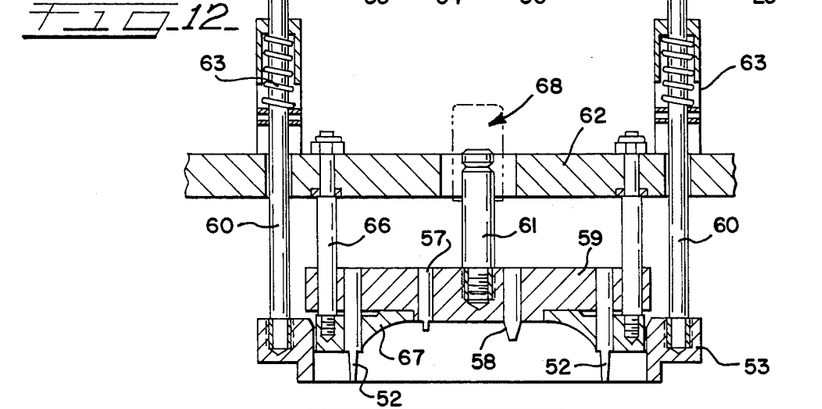
FIG. 12 is a cross-sectional view through the preferred crimper head assembly according to this invention, showing same in its orientation for actual crimping engagement of the patties.
Figure 13:
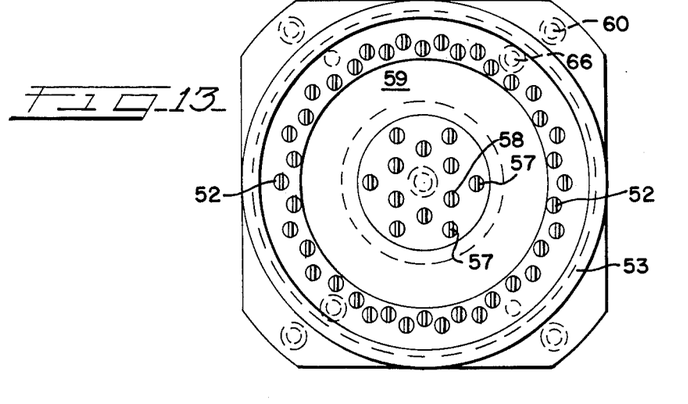
FIG. 13 is a bottom plan view of the crimping head assembly that is shown in FIGS. 11 and 12.

With more particular reference to the crimper heads 24 that are supported by the lower frame 51 of the crimper assembly, each includes a plurality of downwardly depending pins and rings that move with respect to each other and which perform the knitting operation according to this invention. The pins are shown in FIGS. 11, 12 and 13 and include an array of long pins 52 which perform the actual knitting of the plurality of layered proteinaceous patties together, such array being generally disposed along an outer peripheral extent of the patties, which are located within an outer ring or skirt 53 during such knitting or crimping by the long pins 52. During such crimping, the patties are resting upon and moving with the conveyor belt 25, while the lower edge of the outer ring 53 generally engages and moves with the conveyor belt 25.

A typical proteinaceous patty product that is suitably knitted according to this invention is illustrated in phantom in FIG. 11, such including a lower patty, an upper patty 55, and a filling 56. Preferably, the assembly operation is carried out such that the long pins 52 pass completely through the upper patty 55 and partially or completely through the thickness (preferably about one-half thereof) of the lower patty 54 without engaging the filling 56. The extent of such passage can be adjusted as desired. Short pins 57 can be included as illustrated, such being provided primarily for the purpose of imparting a textured appearance to the area of the central portion of the upper patty 55, which is generally in the nature of the textured pattern imparted to the peripheral portion of the upper patty 55 by the long pins 52. One or more intermediate length pins 58 can be provided to substantially completely penetrate the central portion of the upper patty 55 at a location substantially directly above the filling 56 in order to thereby provide a vent in the upper patty 55 so as to provide for relief of pressure build-up during cooking of the knitted product, which is particularly evident when components such as cheeses are included in the filling 56, which pressure build-up could otherwise lead to occasional failure of the product crimps.

Figure 3:
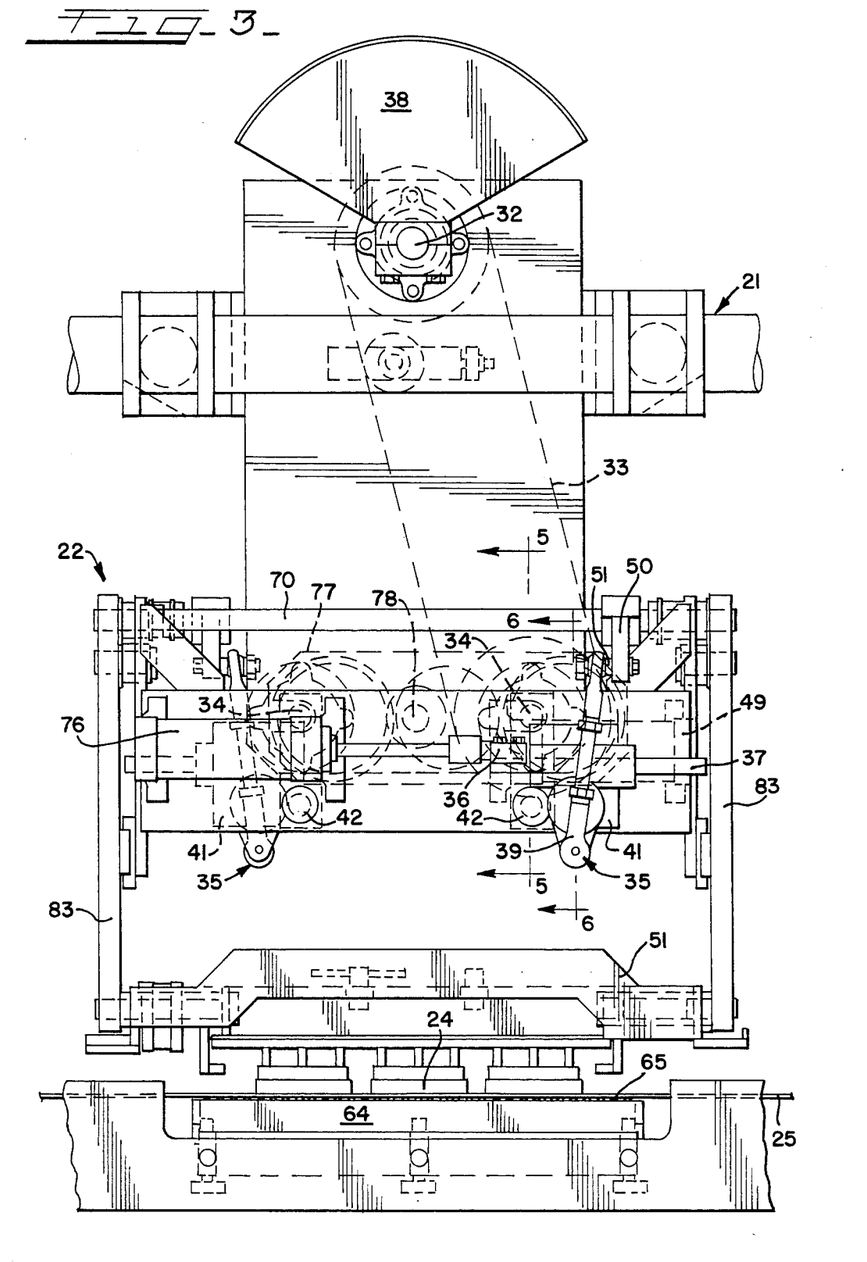
FIG. 3 is an enlarged, detailed side elevational view of the apparatus of FIG. 1 providing further details of the preferred crimping assembly.

Generally speaking, when the outer ring 53 is in its downwardly disposed position as illustrated in FIGS. 11 and 12, the knitting operation is accomplished by movement of a plunger 59 within which the pins 52, 57 and 58 are mounted. This pin plunger 59 is moved toward and away from the outer ring or skirt 53 that is mounted onto guide pins 60 by operation of a lifter arm 61 which moves generally through a base plate 62. The outer ring 53 is mounted onto the base plate 62, preferably in association with compression springs 63 on the guide pins 60 to permit upward movement of the outer ring 53 against the bias of springs 63 upon engagement of the ring 53 with the conveyor belt 25, preferably where the belt 25 is supported by a support assembly 64. A suitable support assembly 64 is illustrated in FIGS. 3 and 4 and includes a plurality of rollers 65 for minimizing friction between the support assembly 64 and the conveyor belt 25 passing thereover.

Also preferably mounted to the base plate 62, such as by way of stand-offs 66, is a stripper ring 67 which has an inside, generally downwardly directed surface that substantially engages the patty product during crimping and particularly during upward movement of the plunger 59 and its pins in order to thereby maintain the patty product substantially onto the surface of the conveyor belt 25 during and at the termination of the crimping mode, as is generally illustrated in FIG. 12. The inside surface of the outer ring or skirt 53 and the inside surface of the stripper ring 67 cooperate to provide a generally domed-shaped cavity that is present during knitting in order to support and, if desired, shape the patties during crimping.

It is preferred that the crimping proceed through more than a single stroke of the plunger 59 and its pins, and such is accomplished by generally up-and-down movement of the lifter arm 61 by means of an actuator assembly, generally designated as 68. Details of the preferred actuator assembly 68 are generally illustrated in FIGS. 7, 8, 9 and 10. An actuator 69 is secured to each lifter arm 61, and each actuator 69 is secured to a rocker arm 71, such as through the illustrated roller chain spring clip links 72. Each rocker arm 71 is secured to a rocker shaft 73 which rotates in response to movement of a pivot arm 74. In the illustrated embodiment, the pivot arm 74 is actuated by movement of a link end 75 through a link 76. Most advantageously, the link end 75 is subjected to rapid sliding movement by actuation of an air cylinder. By this structure, actuation of the air cylinder results in generally up or down movement of the lifter arm 61 and of the plunger 59 and its pins.

Figure 14:
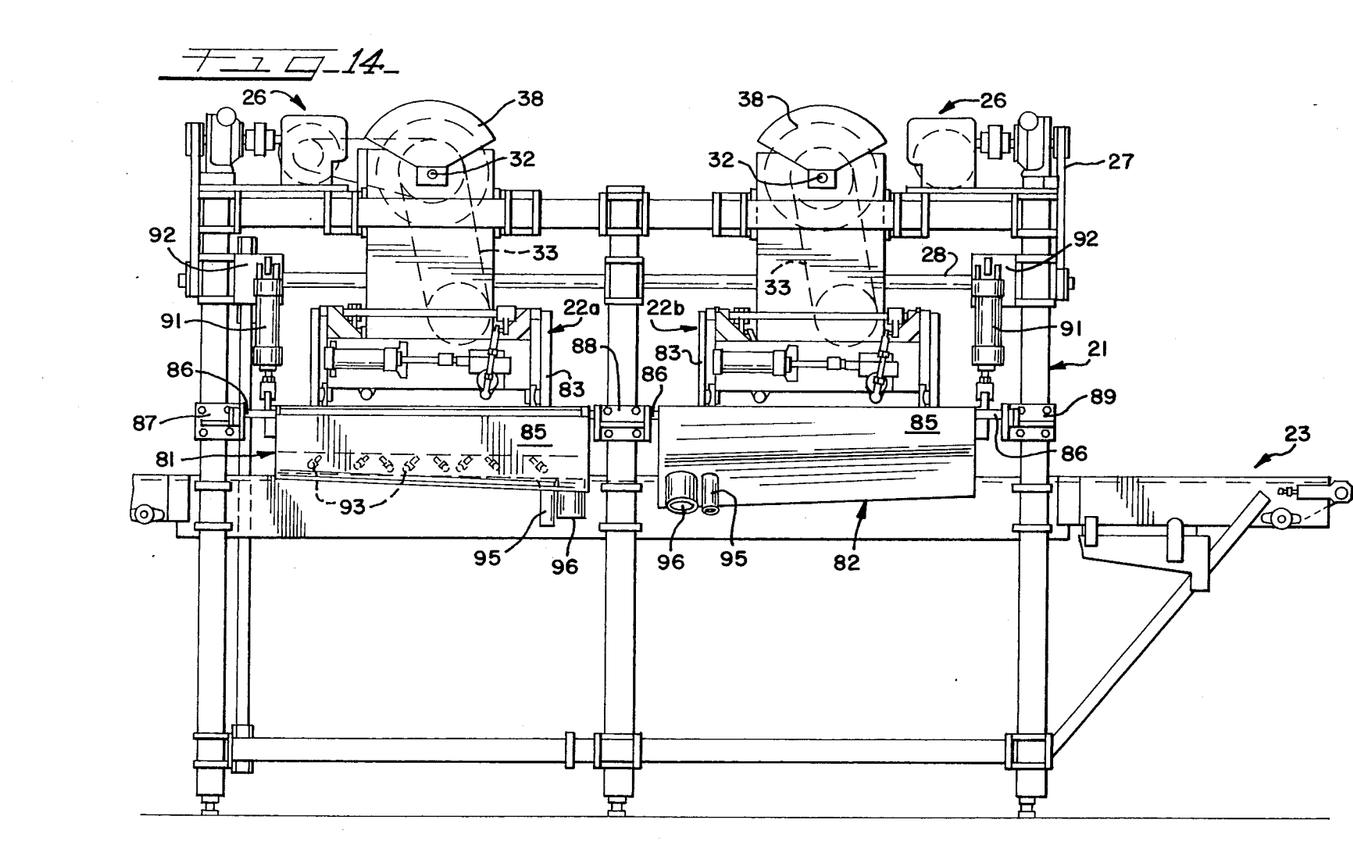
FIG. 14 is a side elevational view similar to FIG. 1 and which further illustrates a crimper head washing assembly included according to the present invention.
Figure 15:
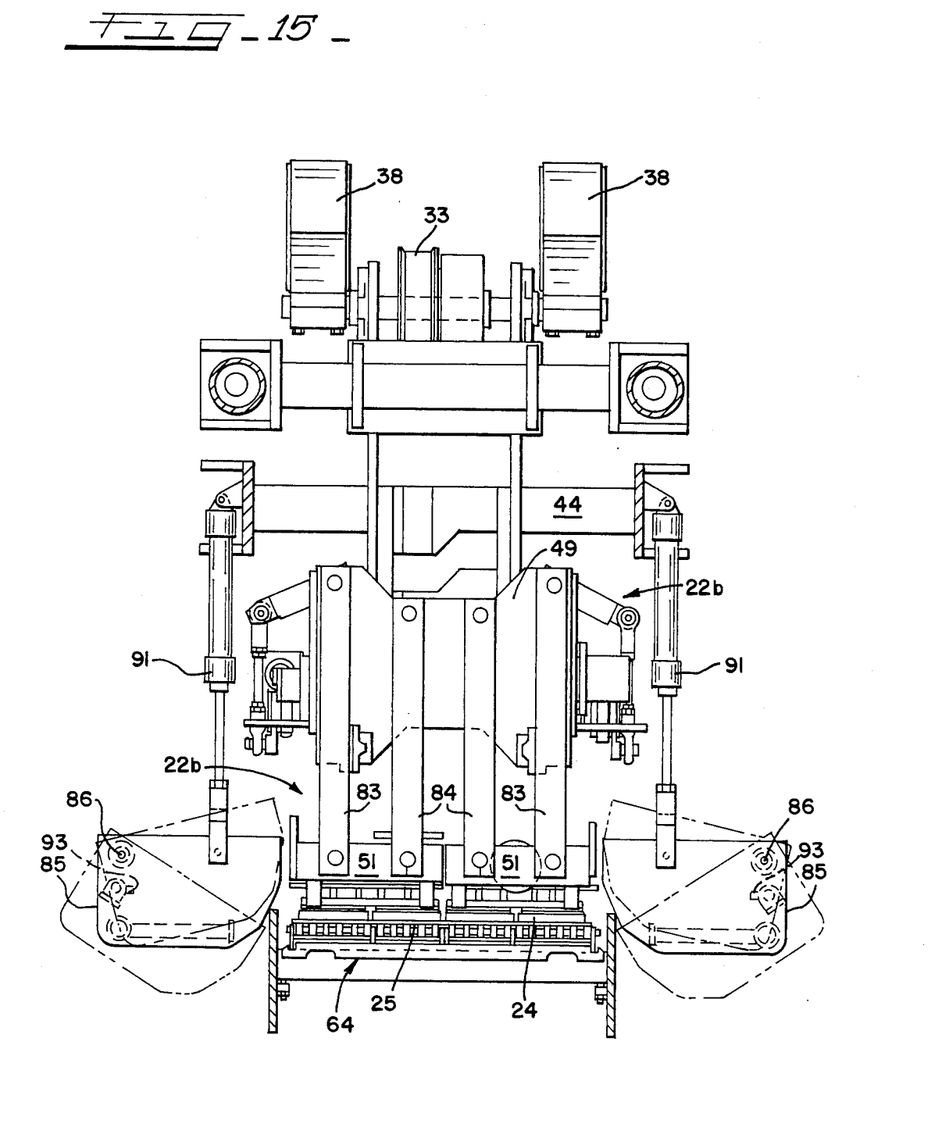
FIG. 15 is an end elevational view of the apparatus illustrated in FIG. 14.
Figure 16:
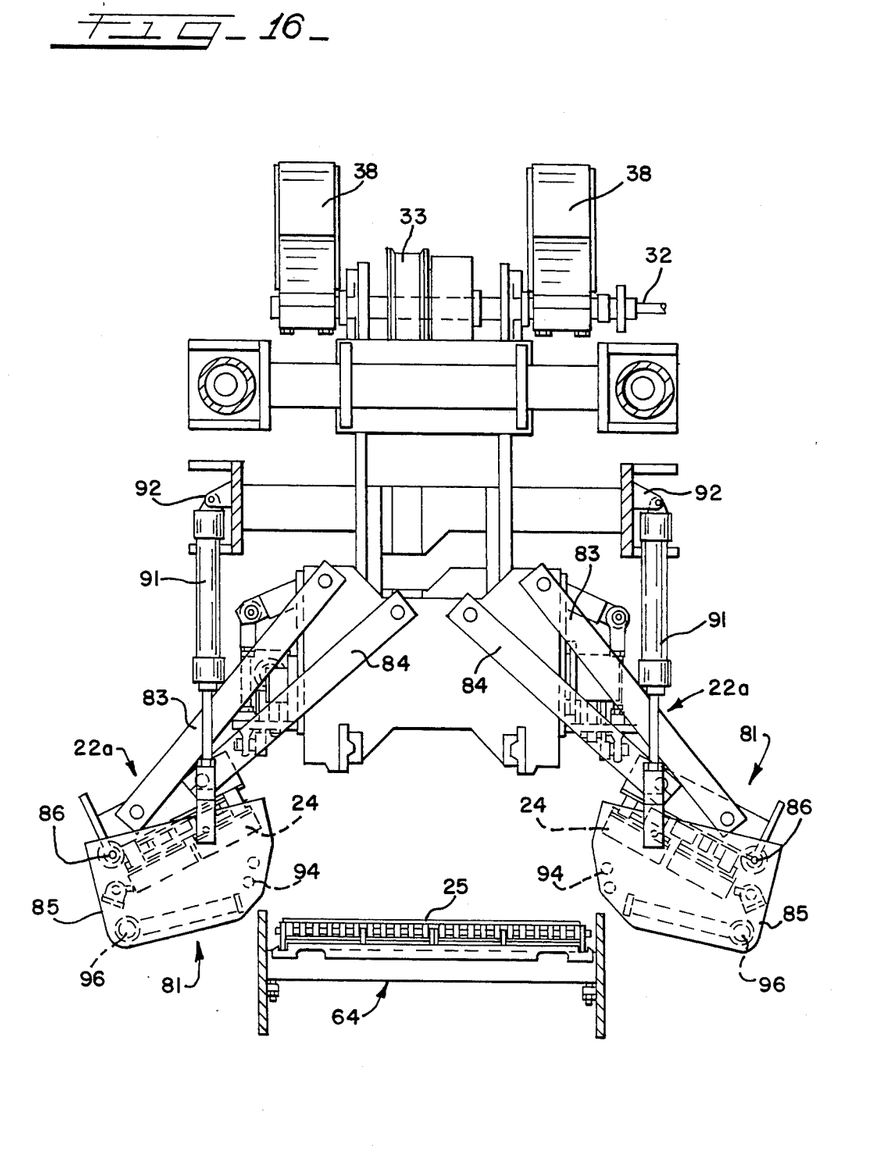
FIG. 16 is a view similar to FIG. 15 which illustrates the washing configuration thereof.

FIGS. 14, 15 and 16 provide details regarding the washing assemblies that can be incorporated into the present invention in order to accomplish washing of desired components of the crimper assemblies 22 without having to interrupt the operation of the apparatus. Two separate crimping assemblies 22 are provided, one of them being in a crimping mode, while the other is in a washing mode. Two wash pan assemblies are illustrated. One of the wash pan assemblies, generally designated as 81, is illustrated in the washing mode, and another wash pan assembly, generally designated as 82, is illustrated in the non-washing mode. In the orientation illustrated in FIG. 14, the crimper assembly 22a that is associated with the wash pan assembly 81 is in a non-crimping mode, and its crimper heads are substantially contained within the wash pan assembly 81. As further illustrated in FIG. 14, the crimper assembly 22b is oriented to effect crimping of proteinaceous patty items moving along the conveyor assembly 23, while its associated wash pan assembly 82 is in its non-washing orientation and does not contain any crimper heads 24. The non-washing mode is further illustrated in FIG. 15, while the washing mode is further illustrated in FIG. 16.

In association with this washing feature, each crimper assembly 22 is pivotally mounted to enable generally swinging movement of the crimper heads 24 between their crimping location above the conveyor assembly 23 and support assembly 64 (as shown in FIG. 15) and their washing orientation within a wash pan assembly 81 (as illustrated in FIG. 16). In the illustrated embodiment, crimper assemblies 22, 22a, 22b include pivotally mounted long arms 83 and short arms 84, which provide operative connections between the lower frame 51 of each crimper assembly and a portion of the upper frame 44 of the crimper assembly. Suitable generally outwardly directed movement of the pair of arms 83 and 84 effects outward movement of the crimper heads 24 to a washing orientation within its wash pan assembly, while generally inwardly directed arcuate movement of the pair of arms 83 and 84 results in positioning of their associated crimper heads 24 at their crimping orientation. Movement of each crimper head 24 to its outwardly directed wash position and back to its crimping position is provided by actuation of air cylinder 76. Crank 35 is rotated by air cylinder 76 through trunion 36 and rack 37. Link 39 connects crank 35 to arm 50. Arm 50 and link 83 are keyed to pivot shaft 70. As crank 35 is rotated by cylinder 76, link 39 moves the arm 50 to rotate the pivot shaft 70 and to swing the link 83 to move the crimp head 24 to its outwardly directed wash position.

Regarding the wash pan assemblies 81 and 82, each includes a pan or tub 85 that is pivotally mounted along an elongated pivot rod 86, which is secured to the frame assembly 21 by suitable members such as the illustrated pivot brackets 87, 88 and 89. The pivot rod 86 is located generally along the upper, outside edge of each tub 85 so that, when the tub 85 pivots therealong, it moves as generally illustrated in phantom in FIG. 15 between a lowered or open and non-washing position, which is the position at which the tub 85 receives and permits passage thereinto of the crimper heads 24 when they have been pivoted generally outwardly in association with movement of the arms 83 and 84 to a location substantially directly above the thus downwardly pivoted or openly oriented tub 85. After these positions have been reached, then the crimper heads 24 remain at their outwardly directed location, and the tub 85 is pivoted generally upwardly in order to thereby generally enclose the crimper heads 24 to complete movement of the crimper assembly and wash pan assembly to the washing orientation. Such pivoting of the tub 85 is effected by suitable means such as the illustrated piston and cylinder assembly 91 that operatively interconnects an upper and generally inwardly positioned location along the tub 85 and a cylinder bracket 92 located thereabove.

As for the washing mechanism associated with each of the wash pan assemblies, such includes a plurality of nozzles 93 which preferably are directed at various orientations designed especially to engage the various pins of each crimper head 24 with a pressurized stream of water or other suitable cleaning formulation. Pressurized air can also be utilized if desired, in association with a suitable manifold assembly 94. Nozzles 93 are typically in fluid passing communication with a liquid inlet conduit 95. A suitable drain opening 96 is also provided.

Preferably, the flow of cleaning formulation through the nozzles 93 is initiated as soon as the crimper heads 24 enter the tub 85, and it is stopped just before the crimper heads 24 exit the tub 85 when they move from the washing to the crimping position. The flow of cleaning formulation through the nozzles 93 is also started and stopped as the crimping assembly moves through its cyclic rotary motion. Cleaning formulation flows when the cycle is in its bottom portion, for example through its bottom 120°, and cleaning formulation does not flow when the cycle is in its upper portion, for example through its top 240°. It is further preferred that the pins of the crimping assembly proceed through their back and forth movement several times during the washing operation, typically even more often than such back and forth pin movement proceeds during the crimping operation. Also, the crimping assembly that is in the washing mode continues to move in the cyclical fashion described herein relative to the crimping motion. This enhances the washing effectiveness and permits each crimping head to keep the proper timing with respect to movement of the conveyor belt so that each patty product on the belt is properly crimped, even during times of changeover from the washing to the crimping positions.

Figure 17:
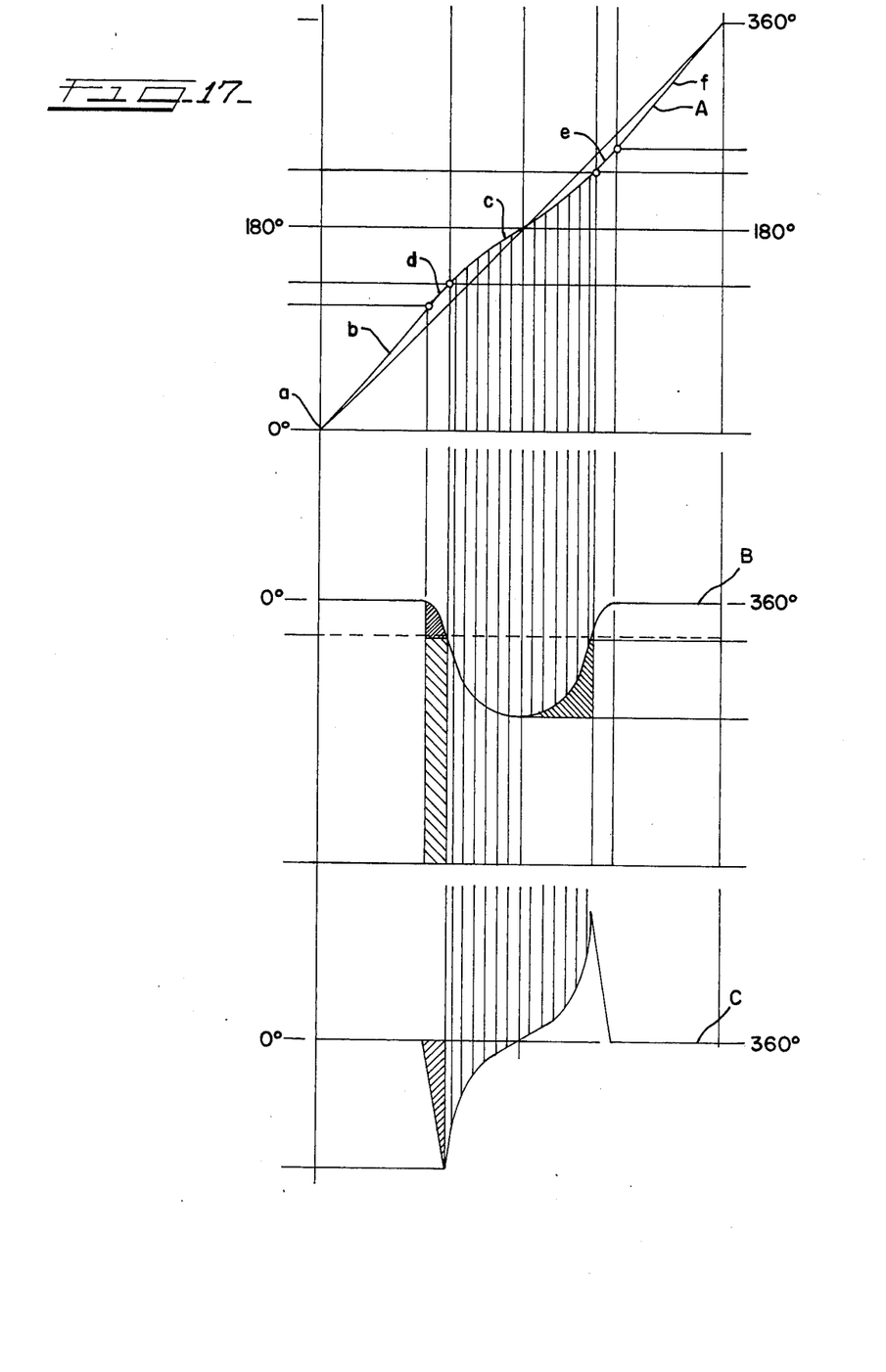
FIG. 17 is a diagrammatic representation of the motion imparted to the crimper heads according to this invention.

FIG. 17 illustrates the motion imparted to the crimper assemblies 22 by operation of the cam assembly 31. Cam assembly 31 preferably takes the form of a so-called "hard" cam such as a face cam incorporating a cam motion box and an associated cam follower. It is also possible to utilize a so-called "soft" cam in this regard, typically including a programmed microprocessor for imparting the desired motion to the crimper assemblies.

FIG. 17 combines three different plots of motion diagrams. Curve A is a plot of input angle in degrees versus the angular displacement in degrees output provided by the cam assembly. Point a of curve A represents the starting point of the crimper assembly 22, which is a location at which the crimper heads 24 are in their uppermost and central position. When the camming assembly 31 is a hard cam, point a represents the top dead center position of the cam follower. Segment b of the curve A shows constant angular displacement motion, which generally corresponds to movement of the crimper heads 24 from this top center location to one somewhat short of initiation of the crimping function, which function is represented by curve c. A transition motion is illustrated by section d. A similar transition section e is shown between the crimping section c and generally constant angular displacement of the crimper heads 24 as illustrated by section f. The angular displacement represented by section c is the angular displacement provided by the cam assembly 31 in order to effect generally linear movement of each crimper head 24 at the same velocity as that of the conveyor belt 25, the illustrated curve c being an inverse sine function. When a hard cam arrangement is used, the mid-point of curve c represents bottom dead center for the cam follower.

Curve B plots the input angle in degrees versus the angular velocity ratio in degrees of output per degree of input and represents the angular velocity that corresponds to the angular displacement shown by curve A. Curve C plots the input angle in degrees versus the angular acceleration ratio in degrees of output per degrees squared of input and represents the acceleration movement corresponding to the angular displacement shown by curve A.

It will be understood that the embodiments of the present invention which have been described are illustrative of some of the applications of the principles of the present invention. Numerous modifications may be made by those skilled in the art without departing from the true spirit and scope of the invention.

We claim:

1. An apparatus for knitting layers of proteinaceous patties together, comprising:
    conveyor means for longitudinally transporting a product at a predetermined rate, the product including a plurality of proteinaceous patties;
    crimper means having a crimper assembly including a crimper head with a plurality of projections for entering the proteinaceous patties wherein said crimper assembly rotates in a generally arcuate path in a substantially vertical plane with respect to the conveyor means, which is substantially horizontally oriented, wherein the crimper means includes actuation means for moving the plurality of projections of projections with a back and forth motion, wherein said crimper head includes an outer ring member that generally engages and moves with a belt of said conveyor means during crimping, and said crimper head further includes a plurality of pins inwardly spaced from the periphery of said outer ring, and wherein said outer ring is mounted for generally upward movement thereof upon its engagement with the belt; and
    camming means for generally downwardly positioning said crimper head into engagement with the proteinaceous patty product while same is conveyed by said conveyor assembly generally under said crimper assembly, said camming means further being for moving said crimper head to correspond to said predetermined rate of the conveyor means once the engagement between said crimper head and the proteinaceous patty product has been attained, and said camming means also being for generally upwardly withdrawing said crimper head from its said engagement with the proteinaceous patty product after crimping has been completed;
    whereby said plurality of proteinaceous patties of the product are knitted together while the product is being longitudinally transported by said conveyor assembly.

2. The knitting apparatus according to claim 1, wherein said conveyor means and said camming means are driven in timed sequence by a drive assembly.

3. The knitting apparatus according to claim 1, wherein dual crimper assemblies are provided, one crimper assembly being in a crimping orientation when the other crimper assembly is in a cleaning orientation, with both crimper assemblies continuously sequencing through movements thereof that are effected by said camming means.

4. The knitting apparatus according to claim 1, further including another pin that is generally centrally located with respect to the proteinaceous patty product.

5. The knitting apparatus according to claim 4, wherein said another pin is of a short length and penetrates partially into a top one of the proteinaceous patties.

6. The knitting apparatus according to claim 4, wherein said another pin is of an intermediate length and penetrates through a top one of the proteinaceous patties.

7. The knitting apparatus according to claim 4, wherein said another pin is of a short length and penetrates partially into a top one of the proteinaceous patties, and wherein a further pin is included, said further pin being of intermediate length for penetrating through a top one of the proteinaceous patties.

8. The knitting apparatus according to claim 1, wherein said outer ring is generally slidably mounted for general up and down movement in opposition to biasing means.

9. The knitting apparatus according to claim 1, wherein said pins are mounted onto a plunger for movement toward and away from the outer ring.

10. The knitting apparatus according to claim 9, further including a stripper ring having passageways therethrough for receiving the pins.

11. The knitting apparatus according to claim 1, wherein said conveyor means includes a support assembly generally immediately below and in engagement with a belt of the conveyor means, and wherein said crimper head generally engages said belt at said support assembly.

12. The knitting apparatus according to claim 1, wherein said crimping means includes a plurality of said crimper assemblies positioned generally longitudinally with respect to each other, and wherein said apparatus includes movement means for alternately moving each of said crimper assemblies between a crimping mode at which its crimper head is positioned over the conveyor means and a non-crimping mode at which its crimper head is swung away from the conveyor means.

13. The knitting apparatus according to claim 12, further including a washing assembly mounted for operative engagement with the crimper head at the non-crimping mode.

14. The knitting apparatus according to claim 13, wherein said washing assembly includes a pan sized to receive the crimper head therewithin and nozzles within the pan for directing fluid onto the crimper head within the pan.

15. The knitting apparatus according to claim 14, wherein said pan is pivotally mounted between a crimper head receiving orientation and a crimper head enclosing orientation.

16. The knitting apparatus according to claim 1, wherein said camming means is for imparting cyclical motion to the crimper assembly, which cyclical motion proceeds through sections of angular displacement including constant angular displacement, a transition angular displacement into an inverse sine function angular displacement for providing the movement corresponding to the predetermined conveyor means movement, and another transition angular displacement from the inverse sine function angular displacement to return to constant angular displacement.

* * * * *